United States Patent Office 3,046,281
Patented July 24, 1962

---

3,046,281
3-[β-(p-AMINOPHENYL)ETHYL]-5-METHYL-OXAZOLIDINE-2,4-DIONE
Seymour L. Shapiro, Hastings on Hudson, and Louis Freedman, Bronxville, N.Y., assignors to U.S. Vitamin & Pharmaceutical Corporation, a corporation of Delaware
No Drawing. Filed June 3, 1960, Ser. No. 33,617
1 Claim. (Cl. 260—307)

This invention is concerned with a novel chemical compound, 3-[β-(p-aminophenyl)ethyl] - 5 - methyl-oxazolidine-2,4-dione, which has the formula:

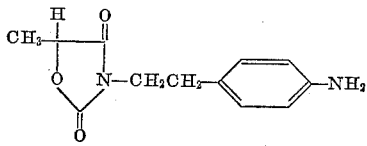

This compound has valuable pharmacological properties in that when employed in low dosage levels in conjunction with other central nervous system depressants, it potentiates the activity of such compounds. It is, moreover, substantially non-toxic and shows little or no central nervous system depressant effects per se.

The compound of this invention is a base, and, as such, may be converted to its soluble salts of the non-toxic mineral acids or strong organic acids such as acetic, malic, tartaric acid.

Additionally, there is asymmetry at carbon 5 of the oxazolidine ring, and accordingly, the invention comprehends the specific d and l forms in addition to the dl form hereinafter disclosed.

The compound of this invention is readily prepared by treatment of the commercially available p-aminophenyl-ethylamine with ethyl lactate and diethyl carbonate under sodium alkoxide catalysis. Alternatively, the amine above can be reacted with ethyl lactate to form the corresponding lactamide, which in turn, can be converted to the product on treatment with diethyl carbonate under sodium alkoxide catalysis.

The process and compound of this invention will be more clearly understood from a consideration of the following specific examples which are given for the purpose of illustration only and are not to be construed as limiting the scope of the invention in any way.

EXAMPLE 1

*3-[β-(p-Aminophenyl)Ethyl]-5-Methyl-Oxazolidine-2,4-Dione*

A mixture of β-(p-aminophenyl)-ethylamine (8.65 g., 0.064 mole), ethyl lactate (7.5 g., 0.064 mole) and diethyl carbonate (28 ml., excess) was treated successively with catalyst (0.1 g. sodium in 2 ml. of ethanol), refluxed for 1 hour and the formed ethanol removed. After this process had been repeated four times, the theoretical quantity of ethanol was obtained. After filtration, the reaction mixture was distilled and the product (1.6 g., 11%) was obtained, B.P. 176–182°/0.08 mm.; bath 280°. The product solidified on standing, and upon recrystallization (ethyl acetate-hexane), melted at 135–140°.

*Analysis.*—Calcd. for $C_{12}H_{14}N_2O_3$: N, 12.0. Found: N, 12.1.

EXAMPLE 2

*N-(p-Aminophenylethyl)-Lactamide*

A mixture of ethyl lactate (8.5 g., 0.022 mole) and β-(p-aminophenyl)-ethylamine (10.0 g., 0.074 mole) was heated under reflux for 15 minutes with noted vigorous exothermic reaction. When cool, 3.8 ml. (90%) of the theoretical ethanol was separated and the gummy residue distilled to yield the product (6.3 g., 42%), B.P. 218–220°/0.08 mm., bath 265–270°.

*Analysis.*—Calcd. for $C_{11}H_{16}N_2O_2$: N, 13.5. Found: N, 13.4.

For therapeutic purposes the compound of this invention is formulated to contain 10–100 mg. of active ingredient in a pharmaceutical extender which does not coact with the active principles described herein.

It is to be understood that it is intended to cover all changes and modifications of the examples herein chosen for the purposes of illustration which do not constitute departure from the spirit and scope of the invention.

We claim:

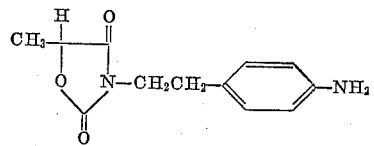

References Cited in the file of this patent

UNITED STATES PATENTS

| | | |
|---|---|---|
| 2,866,734 | Shapiro et al. | Dec. 30, 1958 |
| 2,909,467 | Shapiro et al. | Oct. 20, 1959 |
| 2,928,840 | Shapiro et al. | Mar. 15, 1960 |

FOREIGN PATENTS

| | | |
|---|---|---|
| 621,644 | Great Britain | Apr. 13, 1949 |